(12) United States Patent
Paeschke et al.

(10) Patent No.: US 10,255,515 B2
(45) Date of Patent: Apr. 9, 2019

(54) METHOD AND DEVICE FOR CHECKING A SECURITY ELEMENT

(71) Applicant: BUNDESDRUCKEREI GMBH, Berlin (DE)

(72) Inventors: Manfred Paeschke, Wandlitz (DE); Olga Kulikovska, Berlin (DE); Joerg Fischer, Berlin (DE); Detlef Starick, Greifswald (DE)

(73) Assignee: Bundesdruckerei GmbH, Berlin (DE)

( * ) Notice: Subject to any disclaimer, the term of this patent is extended or adjusted under 35 U.S.C. 154(b) by 120 days.

(21) Appl. No.: 14/439,759

(22) PCT Filed: Oct. 29, 2013

(86) PCT No.: PCT/EP2013/072563
§ 371 (c)(1),
(2) Date: Apr. 30, 2015

(87) PCT Pub. No.: WO2014/067922
PCT Pub. Date: May 8, 2014

(65) Prior Publication Data
US 2015/0294177 A1    Oct. 15, 2015

(30) Foreign Application Priority Data
Oct. 31, 2012    (DE) .................. 10 2012 219 905

(51) Int. Cl.
*G06K 9/00* (2006.01)
*G06K 9/46* (2006.01)
(Continued)

(52) U.S. Cl.
CPC ............ *G06K 9/46* (2013.01); *G06K 9/4652* (2013.01); *G06K 9/4661* (2013.01); *G07D 7/00* (2013.01);
(Continued)

(58) Field of Classification Search
CPC ...... G06K 9/46; G06K 9/4661; G06K 9/4652; G06K 2009/4666; H04N 5/2256; G07D 7/122; G07D 7/00
(Continued)

(56) References Cited

U.S. PATENT DOCUMENTS 6,473,165 B1 * 10/2002 Coombs ................. G07D 7/121
356/71
6,530,527 B1    3/2003 Ahlers et al.
(Continued)

FOREIGN PATENT DOCUMENTS

DE    19708543 A1    9/1998
DE    10304805 A1    8/2004
(Continued)

*Primary Examiner* — Andrew M Moyer
(74) *Attorney, Agent, or Firm* — Laurence A. Greenberg; Werner H. Stemer; Ralph E. Locher

(57) ABSTRACT

A method and a device check a security element of a security document. The security element contains at least one particulate substance with electroluminescent properties and at least one field suppression element. The method includes applying an electric excitation field to the security element, generating an optical image of at least one region of the security element after or during the production of the electric excitation field, and detecting local intensity maxima in the optical image. The security element is verified if a number of local intensity maxima present at different image positions is greater than or equal to a specified number, the number being at least two.

11 Claims, 2 Drawing Sheets

(51) Int. Cl.
    *G07D 7/00*          (2016.01)
    *H04N 5/225*       (2006.01)
    *G07D 7/1205*     (2016.01)

(52) U.S. Cl.
    CPC ......... *G07D 7/1205* (2017.05); *H04N 5/2256* (2013.01); *G06K 2009/4666* (2013.01)

(58) Field of Classification Search
    USPC ........................................ 382/101, 135, 137
    See application file for complete search history.

(56) References Cited

U.S. PATENT DOCUMENTS

| | | |
|---|---|---|
| 6,686,074 B2 | 2/2004 | Muth et al. |
| 7,092,583 B2 | 8/2006 | Ahlers et al. |
| 7,248,730 B2 | 7/2007 | Matsui et al. |
| 7,427,029 B2 | 9/2008 | Bailleu et al. |
| 8,039,094 B2 | 10/2011 | Krietsch et al. |
| 8,540,812 B2 | 9/2013 | Krietsch et al. |
| 2002/0131618 A1* | 9/2002 | Ahlers ................. G07D 7/122 382/101 |
| 2003/0031340 A1* | 2/2003 | Alattar ................. G06K 9/522 382/100 |
| 2007/0199999 A1* | 8/2007 | Bailleu ................. B42D 25/29 235/487 |

FOREIGN PATENT DOCUMENTS

| | | |
|---|---|---|
| DE | 102008034021 A1 | 1/2010 |
| DE | 102008034022 A1 | 1/2010 |
| DE | 102008047636 A1 | 3/2010 |
| EP | 1244073 A2 | 9/2002 |
| EP | 1631461 B1 | 3/2006 |
| EP | 1748903 A1 | 2/2007 |

\* cited by examiner

METHOD AND DEVICE FOR CHECKING A SECURITY ELEMENT

BACKGROUND OF THE INVENTION

Field of the Invention

The invention relates to a method and an apparatus for checking a security element, in particular a security element contained in a security document.

EP 1 631 461 B1 discloses a valuable document having at least one security element which comprises, in a marking region, a marking layer comprising electroluminescent pigments applied on a carrier body, wherein a plurality of field displacement elements having a dielectric constant of more than 50 and each being electrically insulated from its surroundings are distributed in the marking region, which field displacement elements have an average distance from one another of approximately 5 µm to 500 µm so as to form intermediate spaces for the electroluminescent pigments and increase a macroscopically applied electric field strength locally in the intermediate spaces.

EP 1 748 903 B1 discloses a machine-readable security element for security products, including at least one particulate substance having electroluminescent properties and a transparent, electrically conductive pigment, wherein at least one layer of the security element contains both a particulate substance having electroluminescent properties and a transparent, electrically conductive pigment, wherein they are present in statistical distribution.

DE 10 2008 047 636 A1 discloses an apparatus for checking the authenticity of a security document having a security feature which is electroluminescent at least at an excitation frequency in a high-voltage alternating field, having a sensor unit, which comprises an excitation module, a condenser system and a detector unit, wherein the security document is moved through the sensor unit and the luminescent light is collected by the condenser system and is directed onto the detector unit which captures the luminescent light and spectrally evaluates it, wherein the excitation module has a slit-shaped opening which spans with its opposing delimitation surfaces a movement path of the security documents to be checked.

BRIEF SUMMARY OF THE INVENTION

The technical object is to provide a method and an apparatus for checking a security element, in particular a security document that contains at least one particulate substance having electroluminescent properties and at least one field displacement element, which allow verification of the security element that is as easy to implement as possible while being reliable.

The technical object is achieved by the subjects having the features of claims 1 and 8. Further preferred embodiments can be gathered from the dependent claims.

The technical object is achieved by the subjects having the features of the main claims. Further preferred embodiments can be gathered from the dependent claims.

Proposed is a method for checking a security element of a security document, wherein the security element contains at least one particulate substance having electroluminescent properties and at least one field displacement element.

One concept on which the invention is based is that the security element is verified if, after external excitation of electroluminescence, a great number of spatially discretely distributed intensity maxima are detected in an optical image of the security element, wherein said intensity maxima are caused by the presence of the particulate substance having electroluminescent properties and the at least one field displacement element.

The substances having electroluminescent properties are generally particulate materials, the basic lattices of which comprise inorganic compounds of groups II and VI of the periodic table, preferably ZnS, and which are doped with ions of such metals as Cu, Mn or Ag and co-doped with ions of the elements Cl, Br, I or Al. However, the use of electroluminescent materials is not limited to this class of compounds. It is also possible for other pulverulent inorganic phosphors or even particulate organic polymers or homogeneously distributed organic light-emitting materials or mixtures of said compounds to be used, as long as they exhibit electroluminescence detectable under the field excitation conditions applied. The substances used emit after excitation in an alternating electric field primarily electromagnetic radiation in the visible range, with emission in the ultraviolet or infrared spectral range also being possible, however.

Advantageously, the particles are present in the form of micro-encapsulated compounds. Particularly suitable materials for the enveloping layer are in particular polymers or various metal oxides. They protect the electroluminescent substances against various environmental influences, for example against the aqueous components of the printing ink which can, with long-term action, bring about disintegration of the electroluminescent substances. As a result, the resistance to ageing of the electroluminescent substances can be increased. If appropriate, the enveloping layers also have a specific filter effect, through which the light emission of the electroluminescent particles can be modified.

The size of the particles is selected such that they are suitable for processing by means of printing technology and in particular for gravure printing. Suitable for this purpose are preferably average particle sizes in the range of approximately 0.2 to approximately 100 µm, preferably 1 to 50 µm, and with particular preference 2 to 30 µm.

So as to ensure that no excitation of luminescence in the ultraviolet spectral range occurs, it is possible to additionally apply UV filter layers to the surface of the electroluminescent particles.

It is also possible to coat the particulate electroluminescent substances with inorganic or organic dyes, or to add the dyes to them, which can result in a shift of the reflection or absorption bands and the emission spectra of said substances. It is thus possible to expand the range of the available color hues for the light emission.

The particulate electroluminescent substances are used alone or in a mixture of two or more different ones. If different substances are used, it is advantageous if they emit radiation of different colors.

As disclosed in EP 1 631 461 B1, in order to keep the electric field strength that is to be macroscopically applied and is necessary for the excitation of electroluminescence of the pigments low, field displacement elements which are electrically insulated from their surroundings are provided in each case in the region of the security element, which field displacement elements increase the applied electric field in the region of their intermediate spaces due to their dielectric constants which are chosen to be suitably high and on account of the resulting field displacement, in particular in the longitudinal direction thereof. With this local field increase, the field strengths necessary for excitation of electroluminescence are achieved locally in said intermediate spaces, even in the case of relatively low macroscopically applied field strengths, wherein the field displacement elements are dimensioned to be suitable for the desired amplification effect in particular with respect to the lateral size of the intermediate spaces there between.

A particularly suitable amplification effect of the electric field in the local vicinity of the electroluminescent pigments can be achieved by suitably dimensioning the field displacement elements advantageously also with respect to the average size thereof and in particular adapting them to the typically prevailing grain sizes of the electroluminescent pigments. To this end, the lateral size of the field displacement elements is advantageously up to approximately 500 µm, in particular between 2 µm and 100 µm.

To ensure the desired field displacement, the field displacement elements can be formed from a dielectric material having a dielectric constant that is chosen to be suitably high. However, particularly effective field compression into the intermediate spaces there between can be achieved by using field displacement elements formed from electrically conductive material such that they form electrodes which are in each case electrically insulated from their surroundings, what are known as "floating" electrodes.

In order to influence and focus the electric field in a targeted manner that can be adapted to the pigments used, the field displacement elements are preferably applied to the carrier body by means of printing technology, that is to say utilizing a customary printing method, such as intaglio printing technology or screen printing technology for example. Even in the case of a relatively statistical distribution of the electroluminescent pigments in the marking layer, an amplification effect which is particularly uniform over the surface can be achieved, in a further advantageous embodiment, by applying the field displacement elements to the carrier body in the form of a laterally regular structure, preferably in the manner of a point lattice or grid, in the manner of a periodic line structure or in the manner of an open cross lattice. In the case of such field displacement elements which are applied by way of printing technology, their lateral size is advantageously approximately 10 µm to 500 µm, in one particularly advantageous embodiment approximately 50 µm to 200 µm.

In one particularly advantageous embodiment, the field displacement elements, or at least some of them, are incorporated in the form of having a dielectric constant of more than approximately 50, preferably of electrically conductive pigments, in a marking layer forming the security element in addition to the electroluminescent pigments. It is possible here, particularly during application of the marking layer, given a suitable choice of starting product, particularly in the case of intimate mixing of the electroluminescent pigments with the pigments having a high dielectric constant in the starting material, to apply both the particles which are actually active in the security elements, that is to say the electroluminescent pigments, and the field-amplifying particles, that is to say the pigments with a high dielectric constant, in just one operation and thus with particularly low complexity.

A security document is any document which is a physical entity that is protected by security features from unauthorized manufacture and/or forgery. Security features are features that at least make forgery and/or duplication more difficult than simple copying. Physical entities which comprise or form a security feature are referred to as security elements. A security document can comprise a plurality of security features and/or security elements. In the sense of the definition established here, a security document also always constitutes a security element. Examples of security documents, which also include valuable documents that represent a value, comprise for example passports, personal identification, driving licenses, identity cards, entry check passes, medical insurance cards, bank notes, postage stamps, bank cards, credit cards, smartcards, tickets and tags.

The proposed method comprising the method steps described below.

In a first step, an electric excitation field is applied to the security element. The electric excitation field can have a predetermined frequency and is used for excitation of the electroluminescent pigments, whereby they emit corresponding luminescence light or radiation. For this purpose the security element or the security document can be arranged such that it is exposed to the electric excitation field.

In a second step, an optical image of at least a region of the security element is generated after or during the generation of the electric excitation field. This can be carried out for example using an image capturing device. This device can be in the form of a CCD-camera, for example. The image capturing device can also be assigned further optical elements such as lenses and/or mirrors and/or a diffraction grating, by way of which the image can be generated. The image can have a predetermined resolution with respect to a spatial size of the security element.

Thus, the image can have, for example, a predetermined number of image points, which can also be referred to as pixels, which are arranged in rows and columns. Thus, the optical image can be generated in a sensor plane of the image capturing device having a predetermined resolution.

In a third step, an image-based detection of local intensity maxima in the optical image is effected. A local intensity maximum can here designate image points or an image region comprising a plurality of image points, the intensity value(s) of which satisfy a predetermined intensity condition. A local intensity maximum can be formed, for example, by an image point, wherein in a predetermined surrounding area of this image point the intensities have no greater values than the intensity of this image point. The intensity of the image point, which forms the local intensity maximum, can also be greater by a predetermined percentage, for example 10%, than the intensities of all the image points located in a predetermined surrounding area. Of course, other criteria for determining the local intensity maxima are also conceivable. An image region which forms a local intensity maximum can comprise a plurality of contiguous image points that all satisfy the above-mentioned condition. For example, an image region can form a local intensity maximum when intensities of contiguous image points of this image region are greater, for example by a predetermined percentage, than intensities of image points in a predetermined area surrounding an image point of the image region with a maximum intensity value.

In a fourth step, the security element is verified if a number of local intensity maxima present at different image point positions is greater than or equal to a predetermined number, said number being at least two.

Here, only the number of local intensity maxima is required for the verification. Thus, no explicit determination of absolute image point coordinates is required. Rather, only information as to whether image points which constitute local intensity maxima are arranged at various image point positions, is required. For this, the determination of an image point coordinate difference suffices.

The number of generated intensity maxima will depend in particular on the number of electroluminescent pigments present in the security element. It can thus also be checked whether the detected number of a previously known number equals or is greater than this number, or is within a previously known range, wherein the previously known number or the previously known range is dependent on the number of electroluminescent pigments present in the security element. This number can be determined, for example, in dependence on a spatial size of the security element and a spatial concentration of electroluminescent pigments.

The number of detected local intensity maxima can in this case vary from measurement to measurement, in particular also in dependence on an intensity of the excitation field.

Advantageously, a simple determination as to whether a security element contains electroluminescent pigments and field displacement elements in the first place is thus made possible. Furthermore, a simple determination as to whether the security element contains electroluminescent pigments with a determined number or concentration is made possible.

Such a method can be easily implemented in an advantageous manner. In particular, it can be carried out, in banknote checking machines or cash machines, that is to say in a decentralized fashion.

Furthermore, a spatial distance between the local intensity maxima or to a reference element is determined, wherein the security element is verified if predetermined distance properties are satisfied. The spatial distance can for example be determined on an image point basis. If a local intensity maximum is a region of a plurality of contiguous image points, a distance with respect to a geometric center of the region can be determined.

For example, for a first image point, which forms a local intensity maximum, a minimum or a maximum distance to another image point which likewise forms a local intensity maximum can be determined. The security element can be verified if all or a predetermined portion of these distances is/are less than a predetermined minimum distance or greater than a predetermined maximum distance.

For all image points which form a local intensity maximum, a distance to a reference point or a reference line of the image can also be determined. The security element can be verified if all or a predetermined portion of these distances is/are greater than a predetermined minimum distance or less than a predetermined maximum distance.

The reference point can, for example, be the image point in the upper left corner of the image. The reference line can, for example, be an edge line of the image.

In particular, a statistical, for example, histogram-based, evaluation of the distances can also take place, wherein the security element is verified if predetermined statistical properties, such as a predetermined distribution, and/or a predetermined average value, are satisfied.

The distances can also depend on a number or a concentration of the electroluminescent pigments present in the security element. Therefore it can also be checked whether the distances meet previously known distance properties, wherein these are dependent on the number or the concentration of the electroluminescent pigments present in the security element.

Alternatively or in addition, a spatial size of a region of the local intensity maxima can be determined, wherein the security element is verified if predetermined size properties are satisfied. A size in this case refers to an image point-based size. The size can be, for example, a number of contiguous image points of an image region that form a local intensity maximum. The size can also be determined as a diameter of a region containing the image points which are arranged around an image point with a maximum intensity value and the intensity values of which are greater than a predetermined portion, for example half, of the maximum intensity value.

For example, the security element can be verified if all the sizes are greater than a minimum size and less than a maximum size.

In particular, a statistical, for example, histogram-based, evaluation of the sizes can also take place, wherein the security element is verified if predetermined statistical properties, such as a predetermined distribution, and/or a predetermined average value are satisfied.

The size can also be of a number or a concentration of the electroluminescent pigments present in the security element. It can therefore also be checked whether the sizes meet previously known size characteristics, these being dependent on the number or the concentration of the electroluminescent pigments present in the security element.

Furthermore, alternatively or additionally, at least one luminescence-specific property of the radiation captured for generating the image, which radiation can also be referred to as luminescence radiation, is determined, wherein the security element is verified if the luminescence-specific property is satisfied. Luminescence-specific properties can be a predetermined frequency of a temporal intensity profile of the luminescence radiation and/or a color locus of the luminescence radiation and/or a decay behavior of the maximum intensity of the luminescence radiation. A color locus here refers to a spectral range of the luminescence radiation. Other luminescence-based properties can also be evaluated.

By evaluating the above-mentioned further properties, a more reliable verification of the security element results in an advantageous manner.

In another embodiment, an intensity value of at least one local intensity maximum is determined, wherein the security element is verified if at least one predetermined intensity condition is satisfied. Preferably, the intensity values of all local intensity maxima are determined, wherein the security element is verified if all intensities, or a predetermined portion of the intensities, is/are greater than the predetermined intensity.

The predetermined intensity can in particular be dependent on properties of the electroluminescent pigments and on properties of the field displacement elements and a predetermined mixing ratio of the electroluminescent pigments to the field displacement elements. In this case, the applicable rule is that as the number of field displacement elements increases at a constant number of electroluminescent pigments, an intensity value of the local intensity maxima increases since a higher field concentration, and thus stronger excitation, occurs in the intermediate spaces of the field displacement elements.

It can thus be checked in an advantageous manner if the security element has a predetermined mixing ratio of electroluminescent pigments to field displacement elements.

In particular, a statistical, for example histogram-based, evaluation of the intensity values can also take place, wherein the security element is verified if predetermined statistical properties, such as a predetermined distribution and/or a predetermined average value of the intensity values, are satisfied.

The above-explained distances and/or the above-explained sizes of the local intensity maxima can also be dependent on the mixing ratio of electroluminescent pigments to field displacement elements. It can thus be checked whether the distances and/or sizes meet predetermined properties that likewise depend on the mixing ratio.

In a further embodiment, a total intensity of the radiation captured during the generation of the image is determined, wherein the security element is verified if the total intensity is less than or greater than a predetermined intensity value or is within a predetermined intensity interval.

The total intensity can also be determined in image-based fashion, in particular in dependence on the intensity values of all image points. The total intensity is composed also from the above-explained intensity values of the local intensity maxima. The total intensity can also depend on the previously mentioned mixing ratio, wherein, in addition to the intensity values of the local intensity maxima, in particular, the remaining intensity is also taken into account. This in turn advantageously increases the reliability of the verification.

Here, the intensity can be the intensity contained in a predetermined spectral range of the luminescence radiation.

The check as to whether the total intensity corresponds to a previously known total intensity that depends on the mixing ratio of electroluminescent pigments to field displacement elements is also possible without the above-explained detection of local intensity maxima. Therefore, a method is conceivable which comprises the following method steps: applying an electric excitation field to the security element, generating an optical image of at least a region of the security element after or during the generation of the electric excitation field, determining a total intensity of the image, verifying the security element if the total intensity is greater or less than a predetermined intensity or is within a predetermined intensity interval, which is dependent on a mixing ratio of electroluminescent pigments to field displacement elements.

In a further embodiment, at least a first partial region of the security element is additionally illuminated with white light radiation at a first angle of incidence and illuminated with white light radiation at a second angle of incidence. Furthermore, radiation reflected by the first partial region is captured and color hues of the reflected radiation are determined. The security element is verified if two wavelength- and angle-specific color hues are detected.

Alternatively, at least a first partial region of the security element is additionally illuminated with white light radiation at a first angle of incidence and a second partial region is additionally illuminated with white light radiation at a second angle of incidence. The first partial region can here at least partially or completely differ from the second partial region. Furthermore, radiation reflected by the first and the second partial regions is captured, and a color hue of the radiation reflected by the first partial region and a color hue of the radiation reflected by the second partial region are determined. The security element is verified if the color hue of the radiation reflected by the first partial region corresponds to a color hue specified by the first angle of incidence, and the color hue of the radiation reflected by the second partial region corresponds to a color hue specified by the second angle of incidence.

In this embodiment of the method, the above-explained field displacement elements are formed in particular as platelet-shaped effect pigments. An effect pigment refers to a pigment which has at different illumination and/or viewing angles a different visually perceivable color and/or brightness effect. With different color effects, this property is referred to as a color flop. In particular pigments which have a color flop produce in the thus produced security elements color and gloss effects which cannot be copied and are easily visible to the naked eye without aids. Such pigments are also referred to as optically variable.

The optically variable effect pigments preferably have at at least two different illumination or viewing angles at least two and no more than four, but preferably at two different illumination or viewing angles two, or at three different illumination or viewing angles three optically clearly distinguishable discrete colors. Preferably, in each case only the discrete color hues and no intermediate stages are present, that is a clear change from one color to another color is detectable when tilting the security element containing the optically variable pigments. This property on the one hand facilitates the identification of the security element as such by the viewer and at the same time makes copy ability of this feature more difficult, since in commercial print copiers color flop effects cannot be copied and reproduced.

In order to be able to achieve their full visual effect, it is advantageous if the effect pigments employed according to the invention are present in the security element containing them in an oriented form, i.e. they are aligned almost parallel to the surfaces, which are provided with the security element, of the security product. Such alignment generally takes place essentially already by way of the usual methods used for application of the security element, such as for example conventional printing methods.

Platelet-shaped effect pigments used can be, for example, the commercially available interference pigments which are offered under the names Iriodin®, Colorstream®, Xirallic®, Lustrepak®, Colorcrypt®, Colorcode® and Securalic® from Merck KGaA, Mearlin® from Mearl, metal effect pigments from Eckhard and goniochromatic (optically variable) effect pigments such as Variochrom® from BASF, Chromafflair® from Flex Products Inc., Helicone® from Wacker or holographic pigments from Spectratec and other similar commercially available pigments. This list, however, should be regarded only as illustrative and not restrictive.

It is already known here at which angle of incidence for white light radiation which color hues are reflected by the effect pigments that are embodied as field displacement elements. In this case, the white light also contains a proportion of radiation with the wavelength that is reflected at the angle of incidence by the field displacement elements. So if the field displacement elements are embodied as effect pigments or if the security feature contains such effect pigments, it is possible in an advantageous manner to increase the reliability of the verification.

In a further embodiment, at least a first partial region of the security element is additionally illuminated with first radiation at a first angle of incidence and with further radiation at a second angle of incidence, wherein the first radiation has a first wavelength or a first spectral range, wherein the further radiation has a further wavelength or a further spectral range. The first wavelength or the first spectral range is in this case different from the second wavelength and the second spectral range.

Furthermore, radiation reflected by the first partial region is captured and intensities of the reflected radiation are determined. The security element is verified if an intensity is greater than a predetermined intensity.

The first spectral range is a predetermined spectral range which does not match the spectral range of white light and includes the first wavelength. The second spectral range is a predetermined spectral range, which does not match the spectral range of white light and includes the second wavelength. The first wavelength and the first angle of incidence here are tuned to a previously known angle of incidence associated with the effect pigment and a previously known wavelength.

Thus, an intensity which is greater than zero or is a predetermined value is detected only when the angle of incidence and the wavelength correspond to the properties of the effect pigment. Otherwise, an intensity which is zero or less than the predetermined intensity value is detected.

Thus, the presence of a specific effect pigment in the security element can be checked in an advantageous fashion, in particular also when it is embodied as a field displacement element. This increases in an advantageous fashion the reliability of the verification.

Alternatively, at least a first partial region of the security element is additionally illuminated with first radiation at a first angle of incidence, and a second partial region is additionally illuminated with further radiation at a second angle of incidence. Furthermore, radiation reflected by the first and second partial regions is captured, wherein an intensity of the radiation reflected by the first partial region and an intensity of the radiation reflected by the second partial region are determined, wherein the security element is verified if the intensity of the radiation reflected by the first partial region is greater than a predetermined intensity, and the intensity of the radiation reflected by the second partial region is greater than a predetermined intensity.

In this way, it is also advantageously possible to check the presence of a particular effect pigment in the security element, in particular even if it is embodied as a field displacement element. This increases in an advantageous fashion the reliability of the verification.

For example, the first partial region can thus be illuminated by a first light source which, in particular exclusively, generates radiation at the first wavelength, and the first or the second partial region is illuminated by a second light source which, in particular
exclusively, generates radiation at the second wavelength. Alternatively, the first and second partial regions can be illuminated by a light source that generates divergent white light.

In a further embodiment, illumination is effected with the white light radiation or the radiation at a first wavelength and the radiation at a second wavelength with a time delay with respect to the application of the electric excitation field. In particular, the application of the electric excitation field and the illumination can take place in temporally alternating fashion. In a first time period, the electric excitation field is thus applied to the security element, and the resulting luminescence radiation is evaluated. In a time period following the first time period the illumination and the evaluation of the color hues and intensities take place. Thus, advantageously, a disturbing influence of the illumination on the evaluation of the luminescence radiation, and in particular the detection of the local intensity maxima, is minimized.

The activation frequency of the illumination can in this case depend on, in particular be identical to, the frequency of the electric excitation field. If the frequencies are identical, the respective signals can have a phase offset of 180° to each other.

This advantageously increases a robustness of the proposed method.

In one further embodiment, illumination is effected with the white light radiation or with the radiation at the first wavelength and the second wavelength if a voltage of the electric excitation field is less than a predetermined value. This results in an advantageous manner in the illumination being effected only when there is no electric excitation of the luminescence. This, too, can minimize an influence of the illumination on the evaluation of the luminescence radiation and of the optical image.

This advantageously increases a robustness of the proposed method.

A further proposal concerns an apparatus for checking a security element of a security document, wherein the apparatus comprises at least one device for generating an electric excitation field, at least one device for image capturing and at least one evaluation device.

By way of the device for generating an electric excitation field, an electric excitation field can be generated which is applied to the security element. By way of the device for image capturing, an optical image of at least one region of the security element after or during the generation of the electric excitation field can be generated.

Furthermore, by way of the evaluation device, local intensity maxima in the image are detectable, wherein the security element can be verified by way of the evaluation device if a number of local intensity maxima present at different image positions is greater than or equal to a predetermined number, said number being at least two.

Furthermore, a spatial distance between the local intensity maxima can be determined, wherein the security element can be verified if predetermined distance properties are satisfied. Alternatively or additionally, a spatial size of a region of the local intensity maxima can be determined, wherein the security element can be verified if predetermined size properties are satisfied. Alternatively or additionally, at least one luminescence-specific property of the luminescence radiation captured to generate the image can be determined, wherein the security element can be verified if the luminescence-specific property is satisfied.

One of the above-explained methods can be carried out in an advantageous fashion by way of the proposed apparatus.

The apparatus can further comprise optical means for beam-directing and/or forming, such as a lens and/or mirrors and/or a prism and/or a diffraction grating, which are used for the generation of the optical image. The device for image capturing and, where appropriate, the optical means are here configured and/or arranged such that the security element can be imaged with a predetermined resolution. The resolution can here, for example, be selected in dependence on a spatial size of an electroluminescent pigment. In particular, the resolution of the optical image can be selected such that an electroluminescent pigment, which has a predetermined spatial size, is imaged in an image point.

In one further embodiment, the apparatus additionally comprises at least one first light source, wherein the first light source is arranged and formed such that a first partial region can be illuminated with radiation at a first angle of incidence, and a second partial region can be illuminated with radiation at a second angle of incidence. The first light source can in this case be a white light source or a light source which generates only radiation having the first wavelength or with a spectral range that includes the first wavelength.

Alternatively, the apparatus additionally comprises at least one second light source, wherein the second light source is arranged and formed such that the first partial region or the second partial region can be illuminated with radiation at the second angle of incidence. The second light source can in this case be a white light source or a light source which generates only radiation having the second wavelength or with a spectral range that includes the second wavelength.

The light source(s) can here be signal-connected to the device for generating the electric excitation field such that the light source(s) can be activated with a time delay with respect to the electric excitation field.

BRIEF DESCRIPTION OF THE SEVERAL VIEWS OF THE DRAWING

The invention is explained in more detail using an exemplary embodiment. In the figures.

DESCRIPTION OF THE INVENTION

Figure 1:
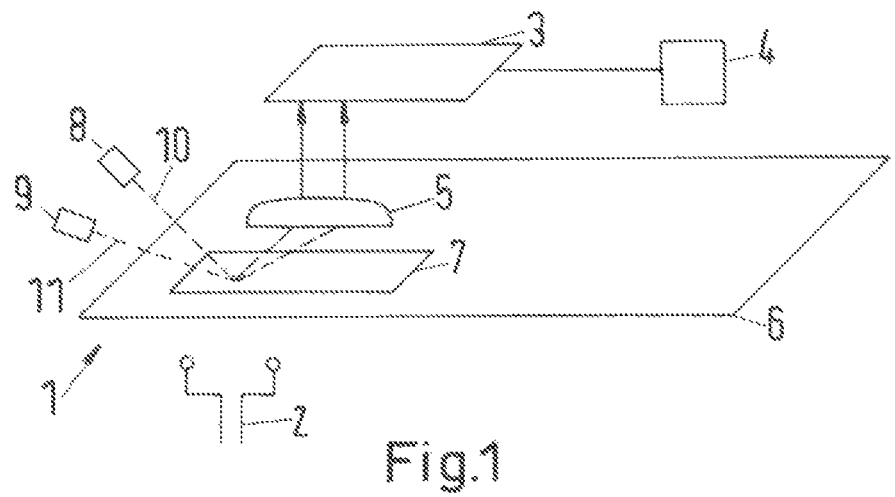
FIG. 1 is a schematic overview of an apparatus according to the invention.

FIG. 1 illustrates a schematic overview of an apparatus 1 according to the invention. The apparatus 1 comprises an electrode 2 for generating an alternating electric field, which serves as an excitation field. Furthermore, the apparatus 1 comprises an image capturing device, which is represented by a CCD chip 3. Furthermore, the apparatus 1 comprises an evaluation device 4, which is signal-connected to the CCD chip 3. Furthermore, the apparatus 1 comprises a lens 5, which can be embodied as a Fresnel lens, for example. A security document 6 has a strip-shaped section 7 which forms a security element. The security element includes at least one particulate substance having electroluminescent properties and at least one field displacement element in a predetermined mixing ratio. The field displacement elements here are embodied as optically variable effect pigments.

By way of the electrode 2, an alternating electric field with a predetermined amplitude and frequency is generated. This excitation field interacts with the electroluminescent pigments and generates luminescence radiation. This radiation is imaged by the lens 5 on the CCD chip 3 with a predetermined resolution. The evaluation device 4 then detects image point-based local intensity maxima in the optical image and determines, in particular exclusively, the number of these local intensity maxima. If this number of the local intensity maxima present at different image point positions is greater than or equal to a predetermined number, said number being at least two, then the security element can be verified.

Furthermore, the apparatus 1 comprises a first white light source 8, and a second white light source 9. The first white light source 8 is in this case arranged relative to the section 7 in such a way that white light 10 is radiated onto the section 7 at a predetermined first angle of incidence by way of the first white light source 8. The light reflected by the section 7 is also imaged on the CCD chip 3 by way of the lens 5. The evaluation device 4 can then determine a color hue of the reflected light. The second white light source 9 is correspondingly arranged in relation to the section 7 such that white light 11 is radiated onto the section 7 at a predetermined second angle of incidence by means of the second white light source 9, wherein the first angle of incidence differs from the second angle of incidence. The light reflected by the section 7 is also imaged onto the CCD chip 3 by way of the lens 5. The evaluation device 4 can then determine a color hue or a spectral frequency of the reflected light.

If predetermined color hues, which are defined by the properties of the optically variable pigment and the angle of incidence, are detected, the security element can be verified.

Figure 2:
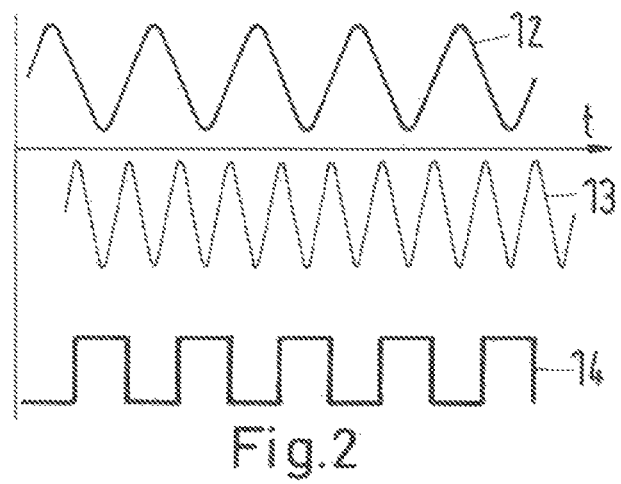
FIG. 2 illustrates an exemplary signal profile of an electric excitation field and an illumination.

FIG. 2 illustrates an exemplary signal profile of an electric excitation field and an illumination over time t. A voltage profile 12 of the electric excitation field has a predetermined frequency and a predetermined amplitude. Likewise illustrated is an intensity profile 13 of a luminescence radiation caused by the excitation field. This luminescence radiation also has an intensity dependent on the properties of the electroluminescent particles, the frequency and the intensity of the excitation field and the mixing ratio of electroluminescent particles to field displacement elements. A spectral range of the luminescence radiation depends on properties of the electroluminescent particles and a frequency of the electric excitation field.

Also illustrated is a time profile 14 of an activation signal for the first white-light source 8 illustrated in FIG. 1 and/or the second white light source 9. The white light sources 8, 9 are only activated and thus only emit white light 10, 11 onto the section 7 if the voltage of the electric excitation field is less than or greater than a predetermined threshold value. As a result, a disturbing influence of the image of the luminescence radiation on the CCD chip 3 (see FIG. 1) by the white light 10, 11 can be avoided.

Figure 3:
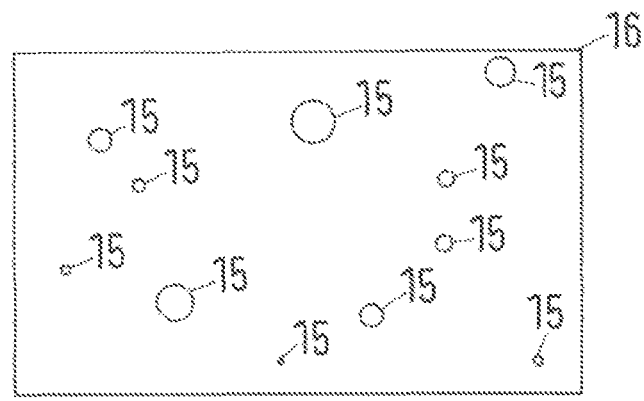
FIG. 3 is a schematic optical image of the security element.

FIG. 3 shows a schematic optical image 16 of the strip-shaped section 7 illustrated in FIG. 3. Here, the optical image 16 has a plurality of local intensity maxima 15. The local intensity maxima 15 here are spatially distributed and have different sizes. In addition to the number of local intensity maxima 15, it is also possible to evaluate a spatial distribution, in particular distances between the local intensity maxima 15, and the size of the local intensity maxima 15 for verification of the security element.

The invention claimed is:

1. A method for checking a security element of a security document, the security element containing at least one particulate substance having electroluminescent properties and at least one field displacement element, which method comprises the following steps of:

applying an electric excitation field to the security element;

generating an optical image of at least a region of the security element after or during a generation of the electric excitation field;

detecting local intensity maxima in the optical image, a local intensity maximum designating image points or an image region containing a plurality of the image points in the optical image;

verifying the security element if a number of the local intensity maxima present at different image positions is greater than or equal to a predetermined number, the number being at least two, wherein:

a spatial size of a region of the local intensity maxima is determined, with the spatial size being the number of contiguous image points of an image region that forms a local intensity maximum, and the security element is verified if predetermined size properties are satisfied.

2. The method according to claim 1, which further comprises determining an intensity value of at least one of the local intensity maxima, and verifying the security element if at least one predetermined intensity condition is satisfied.

3. The method according to claim 1, which further comprises determining a total intensity of luminescence radiation captured during a generation of the optical image, and verifying the security element if the total intensity is less than or greater than a predetermined intensity value or is within a predetermined intensity interval.

4. The method according to claim 1, which further comprises:

additionally illuminating at least a first partial region of the security element with white light radiation at a first angle of incidence and illuminated with the white light radiation at a second angle of incidence, wherein the white light radiation reflected by the first partial region is captured, wherein color hues of reflected white light radiation are determined, wherein the security element is verified if two wavelength and angle-specific color hues are detected; or additionally illuminating at least the first partial region of the security element with the white light radiation at a first angle of incidence and additionally illuminating a second partial region with the white light radiation at the second angle of incidence, wherein the white light radiation reflected by the first and the second partial regions is captured, wherein a color hue of the white light radiation reflected by the first partial region and a color hue of the white light radiation reflected by the second partial region are determined, wherein the security element is verified if the color hue of the white light radiation reflected by the first partial region corresponds to the color hue specified by a first wavelength and a first angle of incidence, and the color hue of the white light radiation reflected by the second partial region corresponds to the color hue specified by a second wavelength and a second angle of incidence.

5. The method according to claim 1, which further comprises:

additionally illuminating at least a first partial region of the security element with first radiation at a first angle of incidence and with further radiation at a second angle of incidence, wherein the first radiation has a first wavelength or a first spectral range, wherein the further radiation has a further wavelength or a further spectral range, wherein the radiation reflected by the first partial region is captured, wherein intensities of reflected radiation are determined, wherein the security element is verified if an intensity is greater than a predetermined intensity; or additionally illuminating at least the first partial region of the security element with the first radiation at the first angle of incidence, and the second partial region is additionally illuminated with the further radiation at the second angle of incidence, wherein the radiation reflected by the first and second partial regions is captured, wherein the intensity of the radiation reflected by the first partial region and the intensity of the radiation reflected by the second partial region are determined, wherein the security element is verified if the intensity of the radiation reflected by the first partial region is greater than the predetermined intensity, and the intensity of the radiation reflected by the second partial region is greater than a predetermined intensity.

6. The method according to claim 4, which further comprises effecting the illumination with the white light radiation or the radiation at a first wavelength and the radiation at a second wavelength with a time delay with respect to an application of an electric excitation field.

7. The method according to claim 5, which further comprises effecting the illumination with the white light radiation or the radiation at a first wavelength and the radiation at a second wavelength with a time delay with respect to an application of an electric excitation field.

8. The method according to claim 6, which further comprises effecting the illumination with the white light radiation or with the radiation at the first wavelength and the second wavelength if a voltage of the electric excitation field is less than a predetermined value.

9. The method according to claim 7, which further comprises effecting the illumination with the white light radiation or with the radiation at the first wavelength and the second wavelength if a voltage of the electric excitation field is less than a predetermined value.

10. An apparatus for checking a security element of a security document, the apparatus comprising:

at least one electric excitation field generator;

at least one image capture device; and at least one hardware processor configured as an evaluation device;

wherein by way of said generator for generating the electric excitation field, the electric excitation field being generated and applied to the security element;

wherein by way of said image capture device, an optical image of at least one region of the security element after or during a generation of the electric excitation field can be generated;

wherein by way of said evaluation device, local intensity maxima in the optical image are detected, a local intensity maximum designating image points or an image region containing a plurality of the image points in the optical image, the security element being verified by way of said evaluator if a number of the local intensity maxima present at different image positions is greater than or equal to a predetermined number, the number being at least two, wherein:

a spatial size of a region of the local intensity maxima is determined, with the spatial size being the number of contiguous image points of an image region that forms a local intensity maximum, and the security element is verified if predetermined size properties are satisfied.

11. The apparatus according to claim 10, further comprising:

white light radiation arranged relative to a section such that light is radiated onto the section illuminating a first partial region with white light radiation at a first angle of incidence;

white light radiation arranged relative to the section such that white light is radiated onto the section at a second angle of incidence; or wherein the first partial region or a second partial region can be illuminated with white light radiation at the second angle of incidence.

* * * * *